(12) United States Patent
Yates

(10) Patent No.: US 10,330,145 B2
(45) Date of Patent: Jun. 25, 2019

(54) GEAR PUMP BEARING

(71) Applicant: ROLLS-ROYCE plc, London (GB)

(72) Inventor: Martin Yates, East Haddon (GB)

(73) Assignee: ROLLS-ROYCE plc, London (GB)

( * ) Notice: Subject to any disclaimer, the term of this patent is extended or adjusted under 35 U.S.C. 154(b) by 214 days.

(21) Appl. No.: 15/618,790

(22) Filed: Jun. 9, 2017

(65) Prior Publication Data

US 2018/0051743 A1    Feb. 22, 2018

(30) Foreign Application Priority Data

Aug. 22, 2016    (GB) .................................. 1614327.3

(51) Int. Cl.
*F16C 17/04*    (2006.01)
*F02M 63/00*    (2006.01)
(Continued)

(52) U.S. Cl.
CPC .............. *F16C 17/04* (2013.01); *F01C 21/02* (2013.01); *F02C 7/22* (2013.01); *F02M 37/041* (2013.01); *F02M 63/00* (2013.01); *F04C 2/14* (2013.01); *F04C 2/18* (2013.01); *F16C 33/121* (2013.01); *F16C 33/122* (2013.01); *F16C 37/00* (2013.01); *F04C 2240/50* (2013.01);
(Continued)

(58) Field of Classification Search
CPC .......... F16C 17/04; F16C 17/10; F16C 37/00; F01C 21/02; F01C 7/22; F04C 2/14; F04C 2240/50
See application file for complete search history.

(56) References Cited

U.S. PATENT DOCUMENTS 3,937,602 A    2/1976    Sharples
4,471,963 A    9/1984    Airhart
(Continued)

FOREIGN PATENT DOCUMENTS

CN    204878370 U    12/2015
DE    3123469 A1    12/1982
(Continued)

OTHER PUBLICATIONS

U.S. Appl. No. 15/618,664, filed Jun. 9, 2017.

*Primary Examiner* — Thomas R Hannon
(74) *Attorney, Agent, or Firm* — Oliff PLC

(57) ABSTRACT

Invention provides gear pump bearing block and method of manufacturing gear pump bearing block. Bearing block includes a bush formed of antifriction alloy, bush having cylindrical portion providing bore adapted to receive bearing shaft of gear of pump, and further having flange portion extending radially outwardly at end of cylindrical portion to provide thrust face adapted to slidingly engage with side surface of gear. Bearing block also has backing layer covering radially outer surface of cylindrical portion and rear face of flange portion, backing layer being formed of less dense alloy compared to antifriction alloy. Furthermore, there is an annular gallery embedded in flange portion such that gallery is spaced from surface of bore and from thrust face, gallery surrounding bore, with inlet to and outlet from annular gallery such that, in use, fluid flows from inlet, through annular gallery to provide cooling of thrust face, and then to outlet.

15 Claims, 8 Drawing Sheets

(51) Int. Cl.
*F16C 37/00* (2006.01)
*F16C 33/12* (2006.01)
*F02C 7/22* (2006.01)
*F04C 2/14* (2006.01)
*F02M 37/04* (2006.01)
*F01C 21/02* (2006.01)
*F04C 2/18* (2006.01)

(52) U.S. Cl.
CPC ...... *F04C 2240/54* (2013.01); *F04C 2240/56* (2013.01); *F04C 2240/60* (2013.01); *F05C 2251/044* (2013.01); *F05D 2220/32* (2013.01); *F16C 2360/23* (2013.01); *F16C 2360/42* (2013.01)

(56) References Cited

U.S. PATENT DOCUMENTS

| | | | |
|---|---|---|---|
| 4,523,365 A | 6/1985 | Richmond | |
| 5,924,854 A | 7/1999 | Blume et al. | |
| 6,524,088 B2 * | 2/2003 | Kasai | F04O 2/086 384/321 |
| 6,575,720 B2 * | 6/2003 | Kasai | F16O 37/002 418/83 |
| 6,716,010 B2 | 4/2004 | Eaton et al. | |
| 6,824,368 B2 * | 11/2004 | Luigi | F04O 2/084 418/83 |
| 7,607,906 B2 | 10/2009 | Yates et al. | |
| 2003/0147765 A1 | 8/2003 | Schlipf et al. | |
| 2005/0232784 A1 | 10/2005 | Yates et al. | |
| 2005/0238267 A1 | 10/2005 | Nakamura et al. | |

FOREIGN PATENT DOCUMENTS

| | | |
|---|---|---|
| EP | 1267076 A2 | 12/2002 |
| EP | 2463536 A1 | 6/2012 |
| EP | 2896833 A1 | 7/2015 |
| FR | 2103296 A5 | 4/1972 |
| GB | 1371041 A | 10/1974 |

* cited by examiner

Section A-A

Section B-B

GEAR PUMP BEARING

FIELD OF THE INVENTION

The present invention relates to gear pump bearings. In particular, but not exclusively, the invention relates to improvements in gear pump bearings for use in aero-engine fuel supply systems.

BACKGROUND

In a gas turbine engine fuel delivery system, pump assemblies, as shown for example in US 2005/0232784, are typically used for pumping the fuel. Where such assemblies include gear pump, gear elements are commonly supported by bearing blocks which are adapted to receive respective bearing shafts of the gears through a bore of each bearing block. These bearing blocks also typically abut axially-directed faces of respective gears of the pumps. The bearing blocks may be for solid bearings, or pressure loaded bearings. A solid bearing typically transfers load from journals to the pump housing, and additionally can transfer axial load to the housing. Pressure loaded bearings also transfer load from journals to housing, and in addition can provide an axial force and a moment against the axially-directed face of the gear which the bearing block abuts.

It is known to use bimetallic (alloy) bearing blocks, as shown, for example, in U.S. Pat. No. 4,523,365. Such a bimetallic bearing block generally comprises an inner bush covered with an outer backing layer. The inner bush is formed of an alloy which provides a tribologically compatible surface for the gear side face and journal to run against. However it may be undesirable for the whole bearing block to be formed of such an alloy. Two reasons for this are that firstly the weight of a block formed solely of such an alloy may be larger than desired, and secondly the difference between the coefficient of thermal expansion (CTE) and that of the light alloy normally used for the pump housing body may be large. Therefore, in a bimetallic bearing block the inner bush is coated with a light alloy backing layer, which reduces the overall weight of the block, and mitigates the CTE difference with the pump housing body.

In order to provide a tribologically compatible surface for the gear side face and journal to run against, an antifriction alloy is typically used to form the inner bush. The antifriction alloy may be, for example, a lead bronze alloy. In particular, the antifriction alloy may be a high lead bronze alloy, with a lead concentration of typically 20-30 wt %, although the alloy composition is not limited to this range, and may be selected according to the desired material properties required for the bearing block and the particular application for which it is being used.

However, testing of bearing blocks which use such an antifriction alloy has shown that such blocks can be prone to suffer permanent radial deformation along the bearing bore when operated above a threshold pressure/temperature combination. If this permanent radial deformation is significant, it can reduce the clearance between the gear journal and the bearing bore. As a result of this reduced clearance, overheating can occur, which may result in mechanical damage of the gear and/or bearing. This problem is more evident in bearing blocks having a higher concentration of lead (e.g. 30 wt % lead bronze bearings), although the same problem may also occur to some extent in bearings having a different alloy composition (e.g. in 20 wt % lead bronze bearings) or made from a different antifriction alloy.

One possible solution to the problem of preventing radial deformation is to use materials having increased strength. Lead-bronze alloys which have a lower lead content, e.g. 20 wt % lead bronze, have a higher yield stress and tend to suffer less permanent deformation in use than lead bronze alloys with a higher lead content, e.g. 30 wt % lead bronze. However, bearings made of 20 wt % lead bronze have also been shown to have poorer performance as thrust bearings than those manufactured from 30 wt % lead-bronze, and suffer a problem of poor load carrying capacity at the thrust face of the bearing block. One reason for this poorer performance may be due to the relationship between thermal conductivity of the material and the wear properties of the material.

FIG. 1 shows a typical Stribeck curve, which describes how coefficient of friction varies for different lubrication regimes. It can be seen that typically, higher coefficients of friction occur in a mixed mode lubrication regime as compared to in a full-film lubrication regime. The thrust faces in a gear pump bearing arrangement typically operate at least partly in a mixed-film lubrication regime. This is evident from the wear and scoring that can be visualised at the thrust surfaces after running. In contrast, the journal element of the bearing typically operates in a full-film lubrication regime. Generally, the loads on the thrust face of a bearing block are lower than those acting on the journal element of the bearing, but the sliding velocities are higher. Accordingly, local heating of the thrust face and gear side face is more likely than in the journal element of the bearing. The situation may be particularly acute at the region of the thrust face under the gear root circle diameter where fluid cooling is limited by the restricted fluid flow that occurs across this section of the thrust face. The primary mode for heat transfer away from the thrust face at this point may be conduction through the inner bush and backing layer of the bearing block. Therefore, depending on the thermal conductivity of the alloys of these components, there may be a problem that heat cannot transfer away from the thrust face sufficiently quickly. This may then lead to reduced wear characteristics, and correspondingly poorer performance of the thrust face in a thrust bearing capacity.

SUMMARY

The present invention aims to address the above problems.

Thus, in a first aspect, the present invention provides a gear pump bearing block having:
- a bush formed of antifriction alloy, the bush having a cylindrical portion providing a bore adapted to receive a bearing shaft of a gear of the pump, and further having a flange portion extending radially outwardly at an end of the cylindrical portion to provide a thrust face adapted to slidingly engage with a side surface of the gear;
- a backing layer covering a radially outer surface of the cylindrical portion and a rear face of the flange portion, the backing layer being formed of relatively less dense alloy compared to the antifriction alloy;
- an annular gallery embedded in the flange portion such that the gallery is spaced from the surface of the bore and from the thrust face, the gallery surrounding the bore; and
- an inlet to and an outlet from the annular gallery such that, in use, fluid flows from the inlet, through the annular gallery to provide cooling of the thrust face, and then to the outlet.

Typically the cooling fluid is also the pumped fluid. However, in some cases the cooling fluid may be a fluid that is different from the pumped fluid.

In a second aspect, the present invention provides a method of manufacturing a gear pump bearing block, the method including steps of:

providing a bush formed of antifriction alloy, the bush having a cylindrical portion providing a bore adapted to receive a bearing shaft of a gear of the pump, and further having a flange portion extending radially outwardly at an end of the cylindrical portion to provide a thrust face adapted to slidingly engage with a side surface of the gear;

forming an annular groove in the rear face of the flange portion and surrounding the bore, the groove being spaced from the surface of the bore and from the thrust face;

partially filling the annular groove with an annular insert having a depth less than the depth of the groove, thereby forming an enclosed volume constituting an annular gallery between a bottom face of the insert and the floor of the groove;

forming an inlet to and an outlet from the annular gallery such that, in use, fluid flows from the inlet, through the annular gallery to provide cooling of the thrust face, and then to the outlet; and covering a radially outer surface of the cylindrical portion and the rear face of the flange portion of the bush with a backing layer, the backing layer being formed of relatively less dense alloy compared to the antifriction alloy.

It will be noted that the above method steps are not necessarily limited to being performed in the order as stated above. For example, the step of forming the inlet to and the outlet from the annular gallery may be performed before or after the step of covering the radially outer surface of the cylindrical portion and the rear face of the flange portion of the bush with the backing layer.

The present invention thereby provides a gear pump bearing block and a method of manufacturing a gear pump bearing block having means for cooling the thrust face of the bearing block in the form of an annular gallery embedded in the flange portion of the bearing block bush. Accordingly, heat transfer away from the thrust face of the bearing block may be improved. By increasing the heat transfer away from the thrust face, the load carrying capacity of the thrust face may be correspondingly improved. This can allow materials with increased strength but less inherent load capability to be used. For example, a lower lead content bronze may be used as the antifriction alloy of the bush rather than a high lead content bronze. Use of such materials with increased strength can thereby help to prevent significant radial deformation of the bore of the bearing block.

In a third aspect the invention provides a gear pump having one or more gears with bearing shafts supported by respective gear pump bearing blocks of the first aspect.

In a fourth aspect the invention provides a fuel supply system of a gas turbine engine having the gear pump according to the third aspect for pumping fuel. For example, the fuel supply system may include a dual stage pump formed of a low pressure pump and a high pressure pump. The low pressure pump may be a centrifugal pump. The high pressure pump may be the gear pump according to the third aspect.

In a fifth aspect, the invention provides a gas turbine engine having the fuel supply system of the fourth aspect.

Optional features of the invention will now be set out. These are applicable singly or in any combination with any aspect of the invention.

The gear pump bearing block may further have a recess in the surface of the bore which forms, in use, a hydrostatic pad for the supply of fluid to the interface between the bore surface and the bearing shaft, the outlet from the annular gallery being formed in the recess. High pressure fluid, e.g. diverted from the discharge of the gear pump, may thus be fed to the hydrostatic pad via the annular gallery formed in the bearing block. The hydrostatic pressure formed in this hydrostatic pad can assist in achieving full-film lubrication at the journal element of the bearing block (i.e. inside the bearing bore, between the gear bearing shaft and the bore surface). The flow exhausting from the hydrostatic pad may also provide forced cooling of the bearing block within the bearing bore. By using the flow in the annular gallery to lubricate the journal element and provide such forced cooling after cooling the thrust face, the amount of flow diverted from the discharge of the gear pump can be reduced. In the context of an aeroengine fuel pump, this may help to ensure that the gear pump has sufficient flow capacity at the low speeds associated with the windmill relight condition. Put another way, reducing the amount of diverted flow means that the size and weight of the pump may not need to be increased.

The inlet to the annular gallery may be formed at the thrust face. However, the inlet is not limited to being formed at a gear-contacting portion of the thrust face. For example, where portions of the thrust face are set back so as to provide side ports which allow fluid into and out of meshing gears, the inlet to the annular gallery may conveniently be formed at such a side port. This may improve fluid flow into the inlet compared to a case where the inlet is formed at a gear-contacting surface of the bearing block.

The gear pump bearing block may further have a bearing bridge insert (see U.S. Pat. No. 7,607,906) at the thrust face partitioning high pressure and low pressure sides of the gear and providing locally increased cavitation erosion resistance. The bearing bridge insert may be formed of, for example aluminium bronze, or any other suitable material. The inlet to the annular gallery may be formed on the high pressure side of the bearing bridge insert. The bearing bridge insert may intersect the annular gallery. In this case, there may be a passage formed in the insert to allow fluid communication of two legs of the annular gallery through the insert.

This can help to ensure that both legs of the annular gallery are fed with an approximately equal delivery pressure and are not left stagnant.

The annular gallery may be located at the same radial position as a gear teeth root circle of the gear which, in use, slidingly engages with the thrust face. This can help to ensure cooling of this typically problematic region of the thrust face.

The annular gallery may be located 2% or more and/or 20% or less of the axial length of the bush from the thrust face, as measured in the axial direction of the bore. The annular gallery may be spaced a distance radially outwards of the surface of the bore, which distance is at least 15% of the radial distance between that surface and the outer radius of the flange portion. The cross-sectional area of the annular gallery may vary around its circumference. This may be achieved by varying the depth of the annular groove formed in the rear face of the flange portion of the bush, and/or by varying the width of the groove around the circumference of the bearing block. By varying the cross-section of the annular gallery in this way, the mechanical strength of the bearing block can be altered, along with the flow velocity and heat transfer coefficients around the annular gallery. The amount of heat transfer is related to the flow number in the cooling gallery.

The antifriction alloy from which the bush is formed may be a lead bronze alloy although other alloys can be used. Where a lead bronze alloy is used, the lead content of the alloy may be selected according to the desired material properties of the antifriction bush, but for example the alloy may have a lead content of between 20 wt % and 30 wt % lead.

The bush may have an antifriction coating of a different material to the antifriction alloy e.g. on the surface of the bore and/or the thrust face. For example, the antifriction alloy may be lead-indium plated or coated with a dry film lubricant. This can increase the tribological compatibility of the bush and the bearing shaft.

The step of covering the radially outer surface of the cylindrical portion and the rear face of the flange portion of the bush with the backing layer may be performed by thermally-spraying the relatively less dense alloy onto the antifriction bush. Conveniently, the thermal spraying technique may be flame-spraying, as described in U.S. Pat. No. 4,523,365. The relatively less-dense alloy may be, for example, aluminium alloy, although this is not particularly limited.

The annular gallery may be formed by partially filling an annular groove formed in the rear face of the flange portion with an annular insert having a depth less than the depth of the groove, thereby forming an enclosed volume constituting the annular gallery between a bottom face of the insert and the floor of the groove. However, the method of forming the annular gallery is not particularly limited to such a process step, and any suitable process capable of forming an annular gallery embedded in the flange portion such that the gallery is spaced from the surface of the bore and from the thrust face may be used. Where the annular gallery is formed by partially filling an annular groove in the rear face of the flange portion with an annular insert, the insert and bush may be machined together to form a continuous, smoothly-profiled rear face. This can assist in providing a smooth surface onto which the backing material can then be applied to form the backing layer. The material from which the insert is formed is not particularly limited, however the insert may be formed of the antifriction alloy.

Once the annular insert is located in the flange portion of the bush, there may be a step of hot isostatic pressing ('HIPing') the block. This may help to prevent leakage paths at the boundaries between different components, in particular around the periphery of the annular insert. The step of HIPing may be performed before or after the step of covering the radially outer surface of the cylindrical portion and the rear face of the flange portion of the bush with the backing layer.

The block may further have an annular formation of one or more stiffening members, the formation surrounding the bore, the, or each, stiffening member being embedded in the flange portion, and the, or each, stiffening member being formed of a material having a higher elastic modulus than the antifriction alloy. The one or more stiffening members can reduce the stresses in the bush adjacent the bore. Additionally, it is possible to provide this advantage without having to sacrifice the performance of the antifriction alloy. Thus, for example, a high lead content bronze alloy having lower yield strength but improved wear performance may be used as the antifriction alloy rather than a lower lead content bronze alloy having a higher yield strength but reduced wear performance.

In order to manufacture a block having such a stiffening member(s), the above method may further include: forming one or more recesses in an annular arrangement in the rear face of the flange portion and surrounding the bore; and locating one or more stiffening members in respective of the recesses, the, or each, stiffening member being formed of a material having a higher elastic modulus than the antifriction alloy. The steps of forming the one or more receiving recesses, and locating the one or more stiffening members in respective recesses may be performed before or after the step of covering the radially outer surface of the cylindrical portion and the rear face of the flange portion of the bush with the backing layer.

The stiffening member(s) may be spaced from the annular gallery. Thus in the above method, the annular groove used to form the gallery may be radially spaced from the recess(es) in which the stiffening member(s) is located. However, another option is to locate an annular stiffening member in the annular groove used to form the gallery, i.e. to use the groove for the gallery as the recess for the stiffening member. Thus the annular gallery may be formed by partially filling the annular groove formed in the rear face of the flange portion with an annular stiffening member having a depth less than the depth of the groove, thereby forming an enclosed volume constituting the annular gallery between a bottom face of the stiffening member and the floor of the groove.

The, or each stiffening member may be spaced from the surface of the bore and/or from the thrust face. In this way, exposure of the stiffening members at the surface of the bore, and/or at the surface of the thrust face can be avoided. This has an advantage that surfaces of the bearing block which contact the gear bearing shaft and gear side surface (at the bore and the thrust face of the bearing block respectively) may be continuously formed of appropriate antifriction alloy. Also, surface exposure of the stiffening member(s) can lead to the formation of fluid leakage paths through the bush.

The, or each, stiffening member may be spaced 2% or more and/or 20% or less of the axial length of the bush from the thrust face, as measured in the axial direction of the bore. The stiffening effect may be tuned by varying the distance of the stiffening member(s) from the thrust face around the circumference of the bore. A spacing of more than 20% may lead to a reduction in the effectiveness of the stiffening member(s) to prevent deformation of the bearing block. A spacing of less than 2% from the thrust face may lead to problems of uneven wear performance of that face.

The, or each stiffening member may be spaced a distance radially outwards of the surface of the bore, which distance is at least 15% of the radial distance between that surface and the outer radius of the flange portion. In this way a controlled amount of elastic and/or plastic deformation of the bush in the region close to the bore can be allowed to accommodate bending and misalignment. Allowing the bore surface to become conformal with the bearing shaft in the circumferential direction through such deformation can increase the load carrying capability of a lubricating fluid film between the bore surface and the shaft.

The gear pump bearing block may have a single annular stiffening member. For example, the stiffening member may be a ring which is positioned symmetrically around the axis of the bore. Such a ring may be embedded into a ring-shaped recess formed in the rear face of the flange portion by, for example, trepanning, or any other suitable manufacturing method.

Alternatively, the gear pump bearing block may have a plurality of circumferentially spaced stiffening members. Conveniently these stiffening member may be rods, although the form of the stiffening members is not particularly limited. The axis of each rod may be substantially parallel to the axis of the bore. The stiffening members may be regularly or irregularly spaced. There may be gaps in the annular array e.g. corresponding to the positions of side ports formed in the thrust face. By varying the distribution of the stiffening members, their diameter and their depth around the circumference of the bearing block, the radial stiffness of the bearing block can be varied to give improved performance.

The entirety of the stiffening member(s) may be embedded within the flange portion. Alternatively, the stiffening member(s) may extend from the flange portion into the backing layer. In this way, the stiffening member(s) may transfer some of the load from the flange portion into the generally stronger material of the backing layer, e.g. by a combination of shear and bending.

The material from which the stiffening member(s) is formed is not particularly limited, provided that the elastic modulus is higher than that of the antifriction alloy material from which the bush is formed. The material may also be a material which has a higher yield strength than the antifriction alloy. One example of a material which may be particularly suitable for forming stiffening members is steel. In the case where there are a plurality of stiffening members, the stiffening members may not all be formed of the same material. This can allow the stiffening effect provided by the stiffening members to be more precisely tuned by providing stiffening members which e.g. vary in elastic modulus around the circumference of the bore. The, or each, stiffening member may be formed of a material which has the same or similar coefficient of thermal expansion as the antifriction alloy. For example, the, or each, stiffening member may be formed of a material which, within ±15%, or within ±10%, or within ±5% has the same or similar coefficient of thermal expansion as the antifriction alloy. This can reduce the generation of significant differential thermal stresses within the bearing block.

The stiffening member(s) may be retained in their respective recesses formed in the rear face of the flange portion by application of the backing layer over the stiffening members. The stiffening member(s) and bush may be machined together to ensure a continuous, smoothly-profiled rear face of the flange portion onto which the backing material can be applied. Alternatively or additionally, the stiffening member(s) may be retained by a variety of other methods including, but not limited to, screwing, interference fitting, adhesive or Lee Plugs™.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES

Although a gear pump bearing block, gear pump and fuel delivery system of the present invention may be used in various applications, a significant intended use is in an aircraft fuel supply system, and the invention will be described hereafter in relation to such a system.

Figure 1:
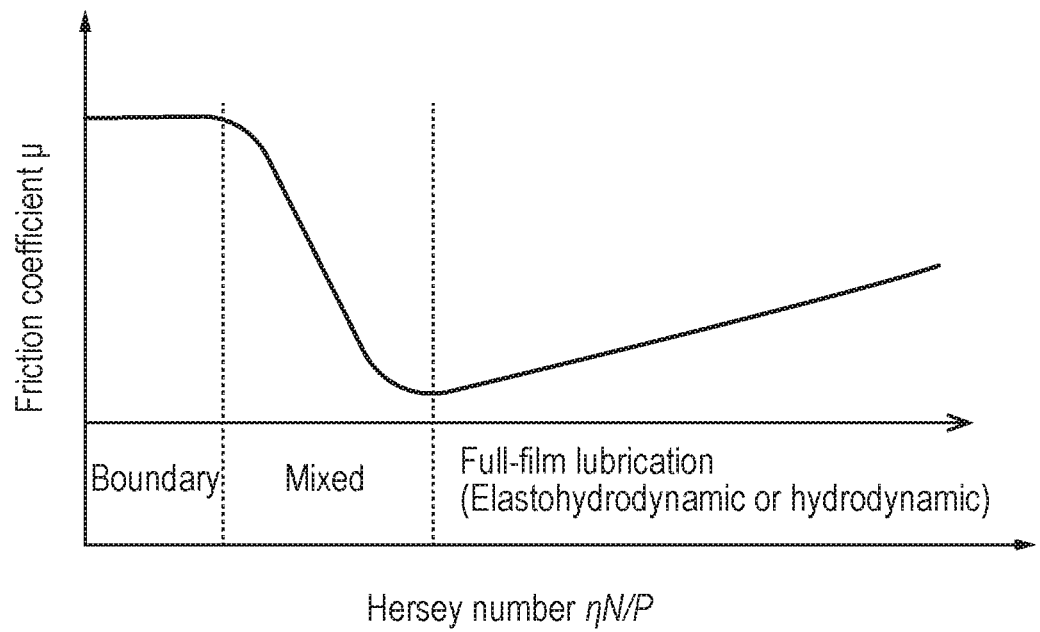
FIG. 1 shows a typical Stribeck curve.
Figure 2:
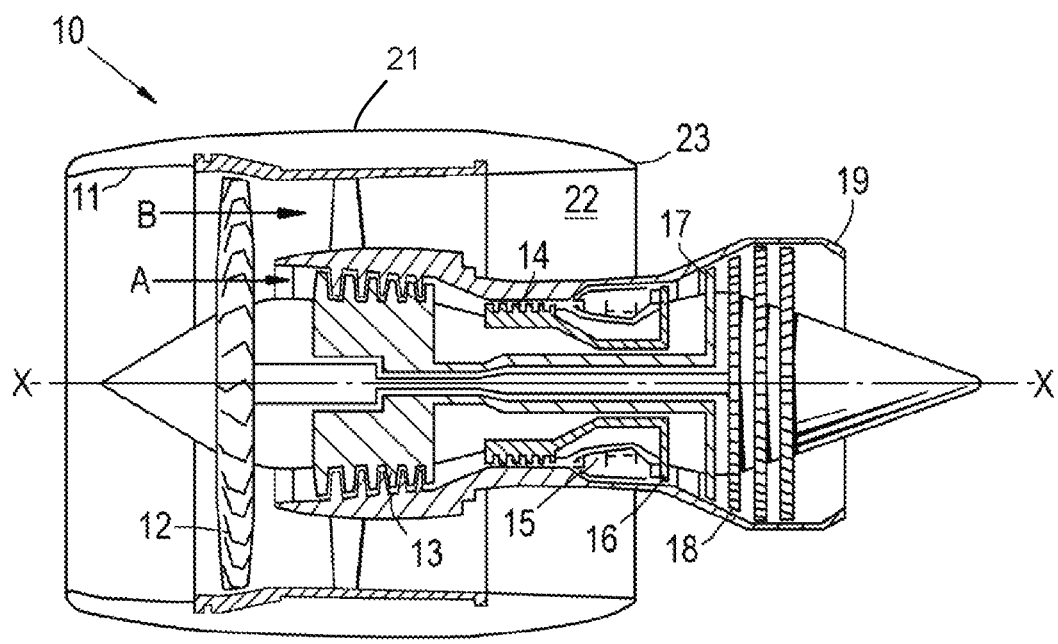
FIG. 2 shows a longitudinal cross-section through a ducted fan gas turbine engine.

With reference to FIG. 2, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

Figure 3:
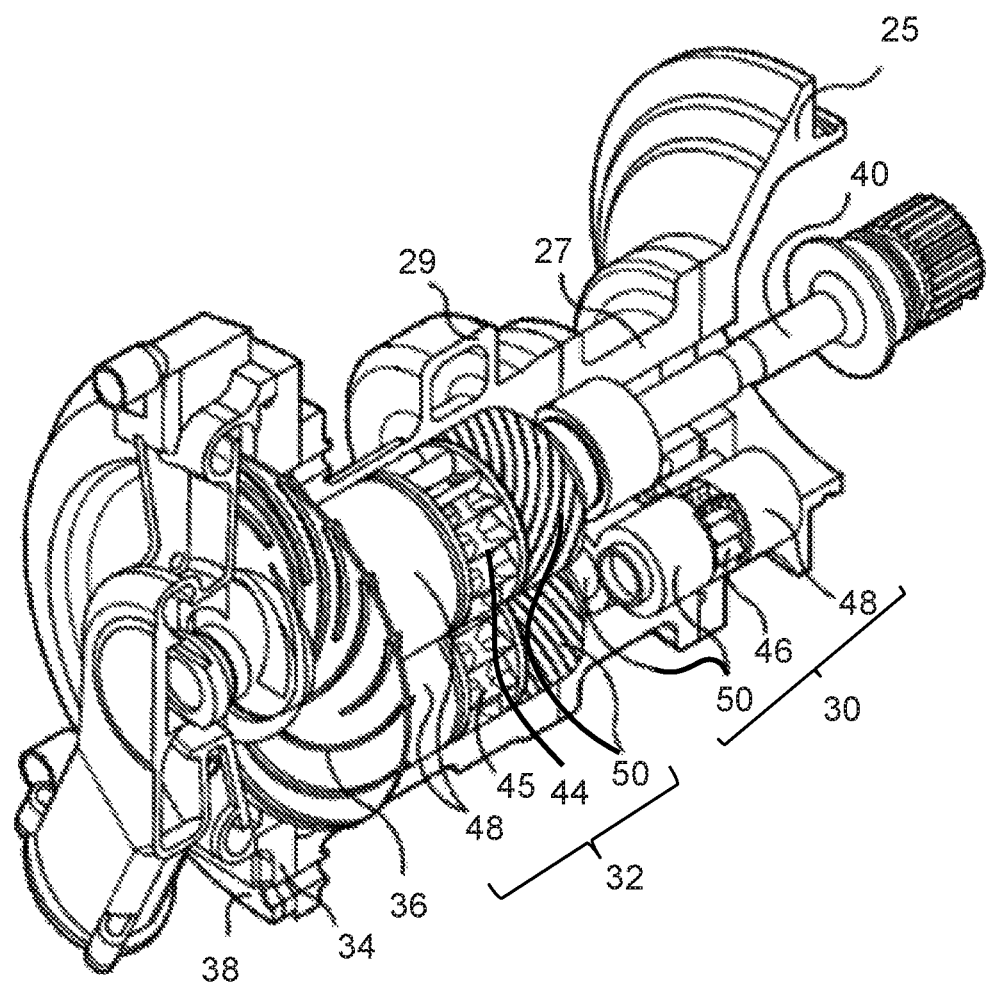
FIG. 3 shows a cut away perspective view of the interior of a pump assembly of the engine.
Figure 4:
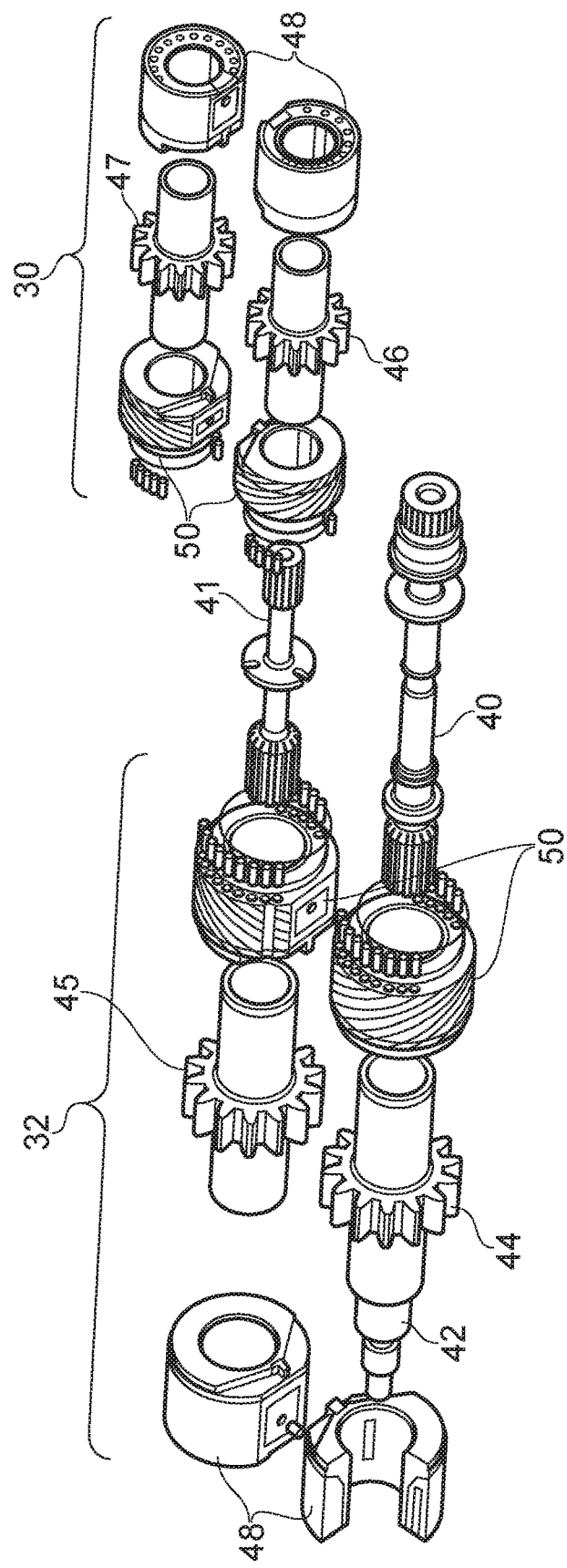
FIG. 4 shows an exploded perspective view of some components of the pump assembly.

FIG. 3 shows a cut away perspective view of the interior of a dual stage pump assembly of a fuel supply system of the engine 10, and FIG. 4 shows an exploded perspective view of displacement gear components of the assembly of FIG. 3. The pump assembly has in sequence: an outer casing comprising a mounting flange 25; a housing 27 for a smaller primary displacement gear pump 30; a housing 29 for a larger secondary displacement gear pump 32; a centrifugal stage back plate 34 which acts as an end cover for the housing 29 and additionally as a back plate for a centrifugal pump 36; and finally at the end of the casing remote from the mounting flange 25 a low pressure stage housing 38 for the centrifugal pump 36, this housing including the centrifugal pump inlet. The centrifugal pump forms the low pressure stage of the dual stage pump assembly, and the two gear pumps form the high pressure stage of the assembly. Typically, the small primary displacement pump 30 is pressurised at all flight conditions, while the large secondary displacement pump 32 is pressurised for high power (above cruise) conditions, and for low speed starting.

A drive shaft 40 which accepts power from an engine accessory gearbox (not shown) has male spline couplings at each end. The drive shaft 40 accommodates for misalignment and connects directly into a driver gear 44 of the secondary gear pump 32, and continues via a linking drive shaft 42 to the impeller and inducer of the centrifugal pump 36. A secondary drive shaft 41 transfers power from the secondary pump to the primary pump 30 and also accommodates for misalignment. More particularly, one splined end of the secondary drive shaft is engaged internally with the driven gear 45 of the larger, secondary displacement pump, whilst its opposite splined end is engaged internally with the driver gear 46 of the smaller, primary gear pump, which drives the driven gear 47 of the primary gear pump.

Each displacement pump gear 44-47 has a respective solid bearing block 48 and a respective pressure-loaded bearing block 50 which are adapted to receive a bearing shaft or journal of that gear. The bearing blocks are shown in greater detail in FIG. 5 and FIG. 6.

Figure 5:
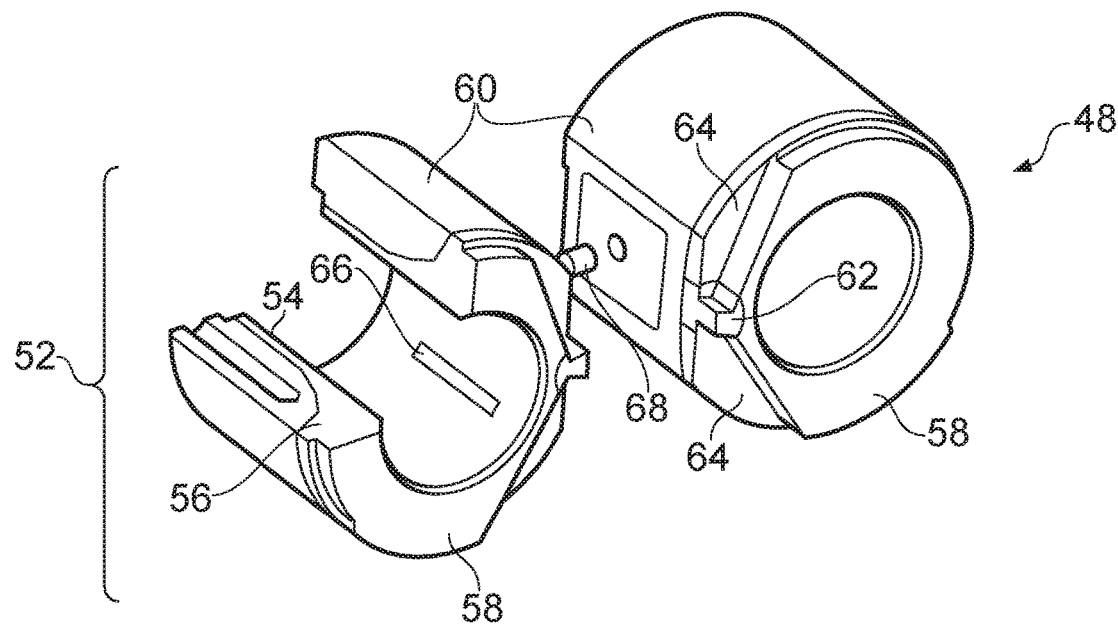
FIG. 5 shows a perspective view of a solid bearing block set.

FIG. 5 shows a perspective view of two of the solid bearing blocks 48 which form a solid bearing set. The solid bearings transfer load from their gear journals to the outer casing, and also transfer axial thrust load to the casing. Each bearing block of the set has a bush 52 formed of antifriction alloy (e.g. lead bronze), the bush having a cylindrical portion 54 providing a bore adapted to receive the bearing shaft of the respective gear, and further having a flange portion 56 extending radially outwardly at an end of the cylindrical portion to provide a thrust face 58 adapted to slidingly engage with a side surface of the gear. Each block also has a backing layer 60 covering a radially outer surface of the cylindrical portion and a rear face of the flange portion, the backing layer being formed of relatively less dense alloy (e.g. aluminium alloy) compared to the antifriction alloy. The bore and thrust face may be e.g. lead-indium plated or coated with dry film lubricant to improve tribological compatibility.

Each solid bearing block 48 further has a bearing bridge 62 which seals high pressure fuel from low pressure fuel. The bearing bridge can be for example an aluminium bronze insert. In addition to providing sealing between high pressure fuel and low pressure fuel, the insert can help to resist cavitation erosion of the bearing blocks, as described in U.S. Pat. Nos. 6,716,010 and 7,607,906. Portions of the thrust face at opposite sides of the bearing bridge are set back so as to provide side ports 64 which allow fuel into and out of the meshing gears.

Each solid bearing block 48 also has a recess in the surface of the bore which forms, in use, a hydrostatic pad 66 for the supply of fluid to the interface between the bore surface and the bearing shaft. A dowel 68 between the bearing blocks engages with corresponding recesses in the sides of the block to limit relative movement of the blocks.

Figure 6:
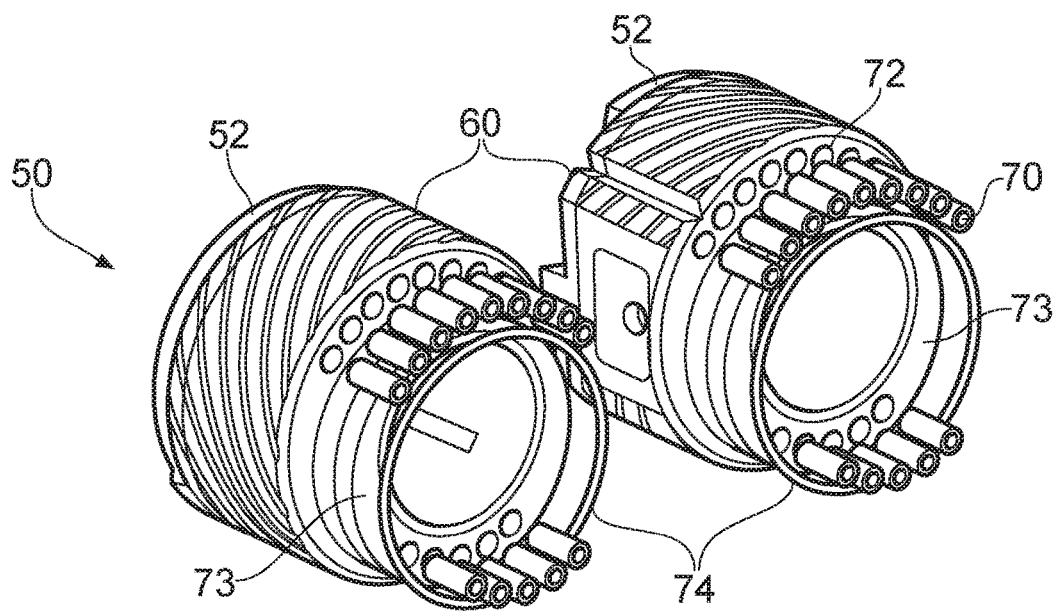
FIG. 6 shows a perspective view of a pressure loaded bearing block set.

FIG. 6 shows a perspective view of two of the pressure loaded bearing blocks 50 which form a pressure loaded bearing set. Similarly to the solid bearing blocks, each pressure loaded bearing block is formed of an antifriction alloy bush 52, covered with a backing layer 60. Like the solid bearing blocks, although not entirely visible in FIG. 6, each pressure loaded bearing block has a cylindrical portion, flange portion, bearing bridge, side ports and hydrostatic pad. Further, the two pressure loaded bearing blocks are fixed together with a dowel and recess arrangement.

Springs 70 are set into respective recesses 72 on the rear of each pressure loaded bearing block 50. These springs provide mechanical load which can increase the force of engagement between the bearing thrust faces and respective side surfaces of the gears. 'O' ring seals 74 are provided at the rear of the bearing blocks to seal high pressure from low pressure. Each seal is carried by an offset nose 73 of the block, with the spring recesses at one side of the block being formed in the nose and the spring recesses at the other side of the block being formed outside the nose. This arrangement determines the hydraulic load and moment forcing the bearings against the sides of the gears.

Under extreme loads the bores in the bearing blocks can experience reductions in diameter, the greatest reductions occurring close to the thrust faces of the bearing blocks, where the complete diameter of each bearing block is formed of lead bronze due to a flange portion of the bush. Such excessive deformation results in the clearance between the gear journal and the bearing bore being reduced, which can correspondingly lead to overheating and eventually damage of the gear journal and/or the bearing block.

Figure 7A:
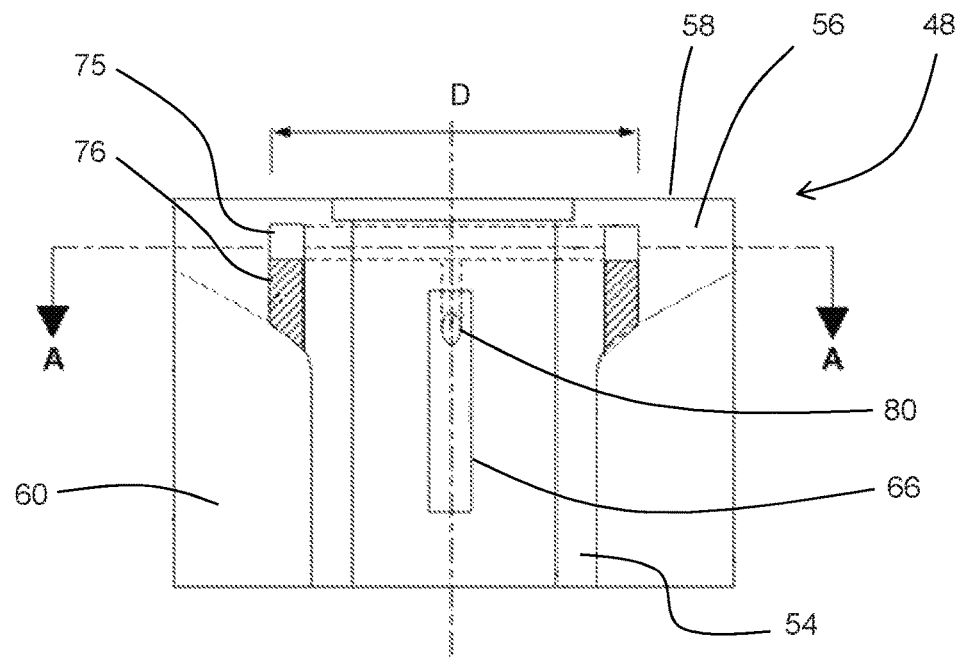
FIGS. 7A and 7B show a longitudinal cross section and a transverse cross section on plane A-A through a solid bearing block having an annular gallery embedded in a flange portion of a bush part of the block.
Figure 7B:
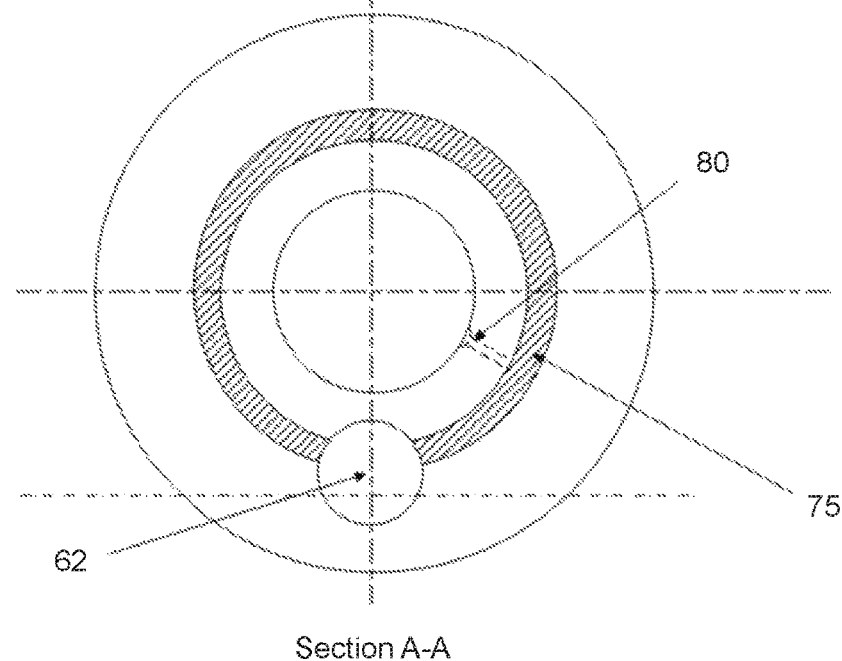

FIGS. 7A and 7B show a longitudinal cross section and a transverse cross section on plane A-A through a solid bearing block 48 which has features to reduce or eliminate such deformation of the bearing bore. Similar features can also be incorporated in a pressure-loaded bearing block 50. In particular, the block 48 has an annular gallery 75 embedded in the flange portion 56 of the bush 52 such that the gallery is spaced from the surface of the bore and from the thrust face. The annular gallery is spaced a distance of between 2% and 20% or less of the axial length of the bush from the thrust face, as measured in the axial direction of the bore, and is also spaced a distance radially outwards of the surface of the bore, which distance is at least 15% of the radial distance between that surface and the outer radius of the flange portion. The gallery surrounds, and is axisymmetric about, the axis of the bore. The gallery has an inlet 78 (not shown in FIG. 7—but see FIG. 8 discussed below) and an outlet 80 such that in use, fluid flows from the inlet, through the gallery to provide cooling of the thrust face 58, and then to the outlet. More specifically, the cooling fluid which, in use, flows through the annular gallery, is the fuel which is being pumped by the gear pump of which the bearing block is a component. By providing cooling the thrust face of the bearing block in the form of the annular gallery embedded in the flange portion 56 of the bearing block bush 52, heat transfer away from the thrust face 58 of the bearing block may be improved. In turn, by increasing the heat transfer away from the thrust face, the load carrying capacity of the face may be correspondingly improved. This can allow materials with increased strength but less inherent load capability to be used. For example, 20 wt % lead bronze may be used as the antifriction alloy of the bush rather than 30 wt % lead bronze. Use of such materials with increased strength can thereby help to prevent significant radial deformation of the bore of the bearing block.

The outlet 80 from the annular gallery 75 is formed in a recess in the surface of the bore. The recess forms, in use, the hydrostatic pad 66 which is fed with the pumped fuel via the annular gallery. The hydrostatic pressure of the fuel at the pad can assist in achieving full-film lubrication at the journal element of the bearing block (i.e. inside the bearing bore, between the gear bearing shaft and the bore surface). The flow exhausting from the hydrostatic pad may also provide forced cooling of the journal element. By using the flow in the annular gallery to lubricate the journal element and provide such forced cooling after cooling the thrust face, the total amount of flow for cooling and lubrication that needs to be diverted from the discharge of the gear pump can be reduced.

The annular gallery can be located at the same radial position as the gear teeth root circle diameter D of the corresponding gear. The cooling of the thrust face 58 thus occurs directly behind the gear teeth root circle diameter D, within the gear teeth root circle footprint. This region of the thrust face has limited fuel flow across it during operation. Location of the annular gallery at the same radial position as the gear teeth root circle can help to ensure cooling of this typically problematic region of the thrust face.

Figure 8:
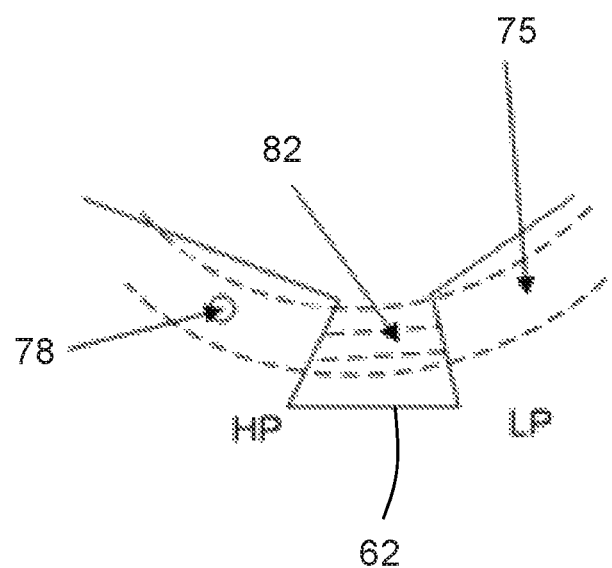
FIG. 8 shows a plan view of a portion of the thrust face of the bearing block of FIG. 8 at a bearing bridge insert.

FIG. 8 shows a plan view of a portion of the thrust face of the bearing block at the bearing bridge insert 62, which intersects the annular gallery 75. A passage 82 formed in the insert allows fluid communication of two legs of the annular gallery through the insert. This can help to ensure that both legs of the annular gallery are fed with an approximately equal delivery pressure and are not left stagnant. The bearing bridge insert 62 provides partitioning between a high pressure HP and a low pressure LP side of the gear and also provides locally increased cavitation erosion resistance. The bearing bridge insert is typically formed of aluminium bronze. The inlet 78 of the annular gallery can be formed in a side port portion of the thrust face, on the high pressure side of the bearing bridge block. In this way, the pumped fuel flows from the inlet into the annular gallery at a relatively high pressure.

The gallery 75 is formed by partially filling an annular groove in the rear face of the flange portion 56 of the bush 52 with an annular insert 76 having a depth less than the depth of the groove, thereby forming an enclosed volume constituting the gallery between a bottom face of the insert and the floor of the groove. The groove may be formed by trepanning, or any other suitable processing step. The flow velocity within the cooling gallery is governed by the cross-sectional area of the gallery and thus by its axial depth. However, the depth of the trepanned groove or depth of the insert inserted into the groove need not be constant around the circumference of the gallery, such that the cross-sectional area of the gallery can be changed around the bush to alter the strength of the bush, as well as to adjust the flow velocity and heat transfer coefficient. Machining considerations and the strength of the antifriction alloy are factors in determining the dimensions and location of the gallery. The insert can conveniently be joined to the bush by soldering or other suitable process. The back surface of the insert can be machined at the same time as the rear face of the flange portion and outer surface of the cylindrical portion 54 to ensure a smooth and continuous surface to accept the aluminium alloy of the backing layer 60, which is sprayed onto the bush.

The material from which the annular insert 76 is formed may conveniently be formed of the same antifriction alloy as that used to make the bush 52.

Another option, however, is for the insert 76 to be a stiffening ring formed of a material having a higher stiffness than the antifriction alloy. In particular, the stiffening ring may be made of a material which has a higher elastic modulus and generally also a higher yield strength than the antifriction alloy of the bush. However, the coefficient of thermal expansion (CTE) of the stiffening ring material is preferably closely matched to the CTE of the antifriction alloy.

The location of the stiffening ring 76 is selected to avoid being exposed or damaged during further processing steps, including, for example machining of the side ports in the thrust face 58. In particular, breaking the ring may reduce its strength, and exposure of the ring can produce undesirable leakage paths in the bush 52.

Figure 9:
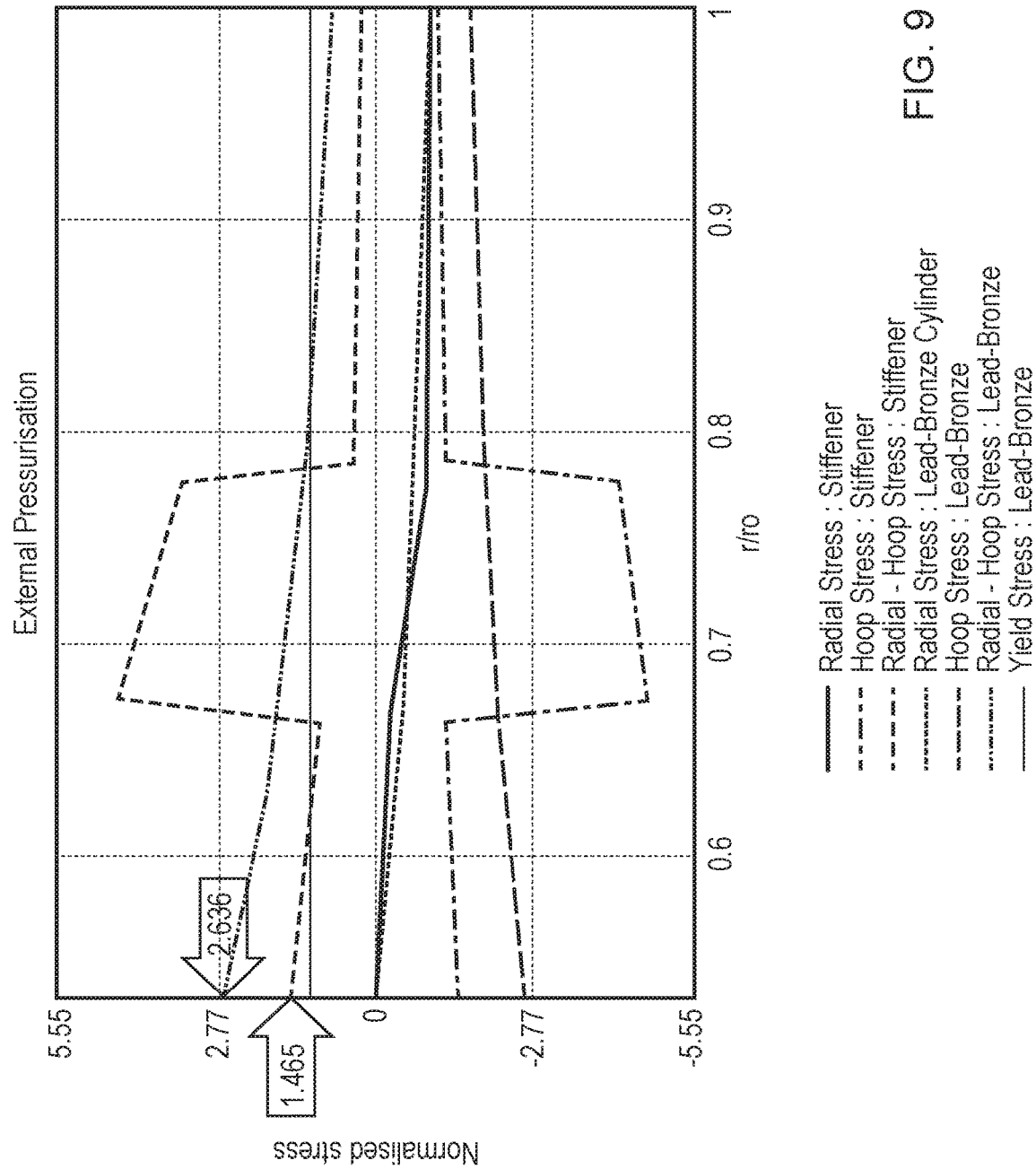
FIG. 9 shows a graph of modelled stress normalised by yield stress against normalised radial distance ($r/r_0$) for a bearing block having a single annular stiffening ring.

FIG. 9 shows a graph of modelled stress normalised by yield stress against normalised radial distance $r/r_0$ for a bearing block having such an annular stiffening ring, $r_0$ being the outer radius of the flange portion 56. The model uses an axisymmetric solution of thick ring theory. It ignores stresses in the axial direction, as well as thermal strains. It also assumes that no stresses are induced in the block during assembly. This implies that the stiffening ring is retained in the recess by a fixing process, such as soldering, that induces few internal stresses. Advantageously, soldering can also help to form a fuel tight seal between the ring and the bush. However, other fixing processes, such as interference fitting, are not excluded.

The modelling assumes a high, but not atypical, uniform external pressure typical of running the corresponding gear pump on a pressure relief valve. The internal pressure distribution resulting from hydrodynamic, elastohydrodynamic and hydrostatic lubrication may also contribute to an "ovalising" deformation, but this is ignored by the modelling. Yielding is modelled using the Tresca criterion, which assumes that yielding occurs when the difference between the radial and hoop stresses exceeds the yield stress as measured in a uniaxial compression test.

In FIG. 9, a steel stiffening ring having a thickness which is approximately 25% of the radial distance from the surface of the bearing bore to $r_0$ is modelled. The inside radius of the ring is at a radial spacing from the surface of the bearing bore, which spacing is also approximately 25% of the same radial distance. This is to allow for a small amount of elastic and plastic deformation in the region of the bush close to the bearing bore in order to accommodate bending and misalignment of the bearing shaft, and allow the bush and shaft to become conformal with each other.

The normalised stress values highlighted by the block arrows in FIG. 9, show that by introducing the steel stiffening ring, the modelling predicts a reduction in the normalised Tresca stress (i.e. (radial stress minus hoop stress)/yield stress) at the bore surface from 2.636 to 1.465. This suggests that the stiffening ring should significantly reduce the amount of deformation of the bearing bore.

In FIG. 7 and FIG. 9, the ring 76 is axisymmetric about the centre of the bearing shaft. However, the stiffening effect can be tuned by having some parts of the ring closer to the thrust face 58 than other parts, or by having the ring thicker in some parts than in others.

The ring 76 should be close to the bore surface where maximum deformation occurs, but not so close that it prevents the bush from accommodating bending and misalignment of the gear shaft. For example, approximate values for a typical gear pump bearing block may be as follows: a typical block 48 may be about 70 mm in diameter and about 40 mm long, and the flange portion 56 may have an axial thickness of 8-10 mm at its outer edge, increasing to an axial thickness of 20-25 mm where it meets the outer surface of the cylindrical portion 54. In such an example, the ring may be 3-6 mm in radial thickness and may be spaced about 3 mm from the thrust face and also about 3 mm from the bore surface. However, these values are in no way limiting, and the actual dimensions of a gear pump bearing block may be selected as appropriate to optimise properties of the bearing block when in use.

Figure 10A:
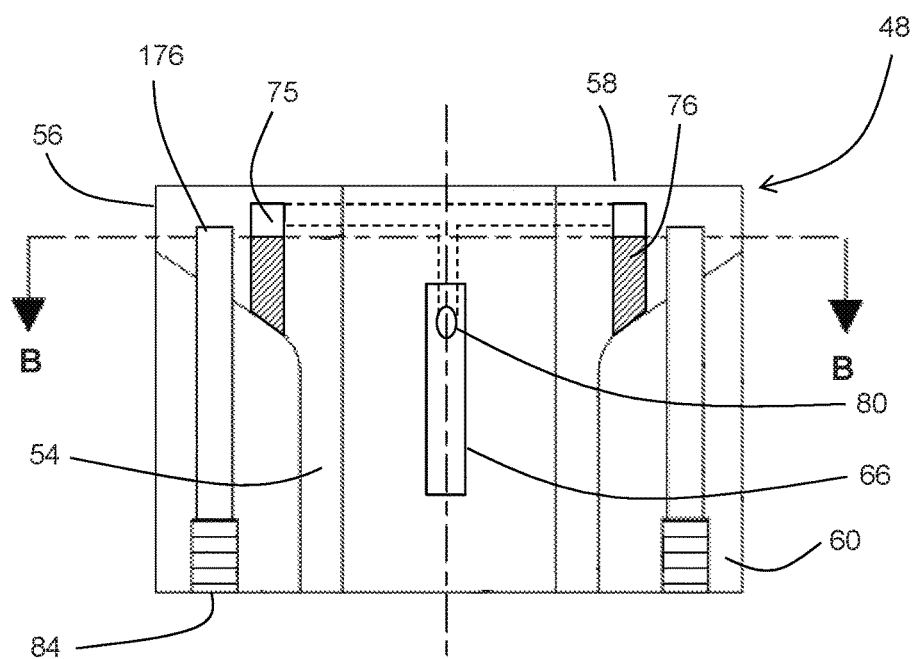
FIGS. 10A and 10B show a longitudinal cross section and a transverse cross section on plane B-B through a solid bearing block having a plurality of circumferentially spaced stiffening members and an annular gallery embedded in a flange portion of a bush part of the block.
Figure 10B:
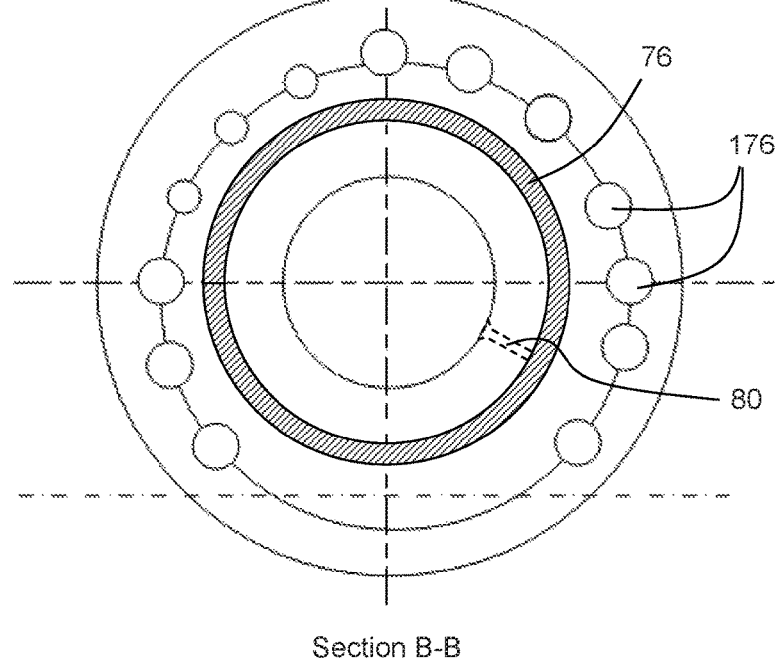

FIGS. 10A and 10B show a longitudinal cross section and a transverse cross section on plane B-B through a variant solid bearing block 48 which also has features to reduce or eliminate deformation of the bearing bore. Again, similar features can be incorporated in a variant pressure-loaded bearing block 50. Corresponding or identical features in FIGS. 7 and 10 have the same reference numbers.

In FIG. 10, the gallery 75 is formed by partially filling the annular groove in the rear face of the flange portion 56 of the bush 52 with an annular insert 76, which may conveniently be formed of the same antifriction alloy as that used to make the bush 52. However, the block 48 also has a plurality of circumferentially spaced stiffening rods or pegs 176. The stiffening rods are arranged in an annular formation with a gap at the bottom sector, as shown in FIG. 10B, to accommodate side ports formed in the thrust face 58. Moreover, the rods are shown in FIG. 10B having different sizes and irregular spacings, but in other blocks the rod sizes may be more or less equal, and the spacings may be more or less regular. In general parameters such as the position, regularity of spacing, depth, number and size of rods may be determined by Finite Element (FE) stress analysis. By varying such parameters, the radial elastic modulus of the bearing block can be varied to give improved performance.

The stiffening rods 176 surround the axis of the bore, and are positioned at approximately equal radial distances from the bore axis, although this is not essential. For example, varying the radial distances from the bore axis may allow for variation in the radial elastic modulus of the bearing block. The rods are also spaced from both the surface of the bore and from the thrust face 58 of the bearing block. Like the annular stiffening ring, the stiffening rods are made of a material (e.g. steel) which has a higher elastic modulus and generally also a higher yield strength than the (e.g. lead-bronze) antifriction alloy of the bush. The CTE of the stiffening rod material is preferably closely matched to the CTE of the antifriction alloy.

The rods 176 are located in respective recesses formed in the rear face of the flange portion 56 of the bush, and extend therefrom in the axial direction of the bore into the backing layer 60 of the block, where they are affixed with plugs 84, which may be, for example, screwed plugs or Lee Plugs™. In this way, the rods may transfer some of the load from the lead-bronze flange portion, which tends to suffer from greatest radial deformation, into the generally stronger aluminium alloy backing layer 60 e.g. by a combination of shear and bending. Hot isostatic pressing can be used to improve the contact between the rods and the lead-bronze and aluminium alloy, and hence improve load sharing and reduce fluid leakage paths.

Another option relevant to both variants discussed above, is to co-cast the stiffening member(s) with the lead-bronze of the bush, e.g. similarly to how an aluminium bronze insert bearing bridge 62 can be co-cast, as described in U.S. Pat. No. 6,716,010.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

What is claimed is:

1. A gear pump bearing block having:
    a bush formed of antifriction alloy, the bush having a cylindrical portion providing a bore adapted to receive a bearing shaft of a gear of the pump, and further having a flange portion extending radially outwardly at an end of the cylindrical portion to provide a thrust face adapted to slidingly engage with a side surface of the gear;
    a backing layer covering a radially outer surface of the cylindrical portion and a rear face of the flange portion, the backing layer being formed of relatively less dense alloy compared to the antifriction alloy;
    an annular gallery embedded in the flange portion such that the gallery is spaced from the surface of the bore and from the thrust face, the gallery surrounding the bore; and
    an inlet to and an outlet from the annular gallery such that, in use, fluid flows from the inlet, through the annular gallery to provide cooling of the thrust face, and then to the outlet.

2. A gear pump bearing block according to claim 1, wherein the gear pump bearing block further has a recess in the surface of the bore which forms, in use, a hydrostatic pad for the supply of fluid to the interface between the bore surface and the bearing shaft, the outlet from the annular gallery being formed in the recess.

3. A gear pump bearing block according to claim 1, wherein the inlet to the annular gallery is formed at the thrust face.

4. A gear pump bearing block according to claim 1, further having a bearing bridge insert at the thrust face partitioning high pressure and low pressure sides of the gear and providing locally increased cavitation erosion resistance, the inlet to the annular gallery being formed on the high pressure side of the bearing bridge insert.

5. A gear pump bearing block according to claim 1, wherein the annular gallery is located at the same radial position as a gear teeth root circle of the gear which, in use, slidingly engages with the thrust face.

6. A gear pump bearing block according to claim 1, wherein the annular gallery is located 2% or more and/or 20% or less of the axial length of the bush from the thrust face, as measured in the axial direction of the bore.

7. A gear pump bearing block according to claim 1, wherein the annular gallery is spaced a distance radially outwards of the surface of the bore, which distance is at least 15% of the radial distance between that surface and the outer radius of the flange portion.

8. A gear pump bearing block according to claim 1, wherein the annular gallery is formed by partially filling an annular groove formed in the rear face of the flange portion with an annular insert having a depth less than the depth of the groove, thereby forming an enclosed volume constituting the annular gallery between a bottom face of the insert and the floor of the groove.

9. A gear pump bearing block according to claim 8, wherein the insert is formed of the antifriction alloy.

10. A gear pump bearing block according to claim 1 further having an annular formation of one or more stiffening members, the formation surrounding the bore, the, or each, stiffening member being embedded in the flange portion, and the, or each, stiffening member being formed of a material having a higher elastic modulus than the antifriction alloy.

11. A gear pump having one or more gears with bearing shafts supported by respective gear pump bearing blocks of claim 1.

12. A fuel supply system of a gas turbine engine having the gear pump according to claim 11 for pumping fuel.

13. A gas turbine engine having the fuel supply system of claim 12.

14. A method of manufacturing a gear pump bearing block, the method including steps of:
   providing a bush formed of antifriction alloy, the bush having a cylindrical portion providing a bore adapted to receive a bearing shaft of a gear of the pump, and further having a flange portion extending radially outwardly at an end of the cylindrical portion to provide a thrust face adapted to slidingly engage with a side surface of the gear;
   forming an annular groove in the rear face of the flange portion and surrounding the bore, the groove being spaced from the surface of the bore and from the thrust face;
   partially filling the annular groove with an annular insert having a depth less than the depth of the groove, thereby forming an enclosed volume constituting an annular gallery between a bottom face of the insert and the floor of the groove;
   forming an inlet to and an outlet from the annular gallery such that, in use, fluid flows from the inlet, through the annular gallery to provide cooling of the thrust face, and then to the outlet; and
   covering a radially outer surface of the cylindrical portion and the rear face of the flange portion of the bush with a backing layer, the backing layer being formed of relatively less dense alloy compared to the antifriction alloy.

15. A method of manufacturing a gear pump bearing block according to claim 14, wherein the step of covering the radially outer surface of the cylindrical portion and the rear face of the flange portion of the bush with the backing layer is performed by thermally-spraying the relatively less dense alloy onto the bush.

* * * * *